United States Patent [19]

Ayres

[11] 3,945,928

[45] Mar. 23, 1976

[54] SERUM/PLASMA SEPARATORS WITH CENTRIFUGAL VALVES

[75] Inventor: Waldemar A. Ayres, East Rutherford, N.J.

[73] Assignee: Becton, Dickinson and Company, East Rutherford, N.J.

[22] Filed: Feb. 27, 1974

[21] Appl. No.: 446,386

[52] U.S. Cl. .......... 210/516; 210/DIG. 23

[51] Int. Cl.$^2$ .......... B01D 21/26

[58] Field of Search ....... 23/230 B, 258.5, 259, 292; 128/2 F, 214 R, 218 M, 272; 210/83, 84, 131, 359, 514–518, DIG. 23, DIG. 24; 233/1 A, 1 R, 26

[56] References Cited

UNITED STATES PATENTS

| | | | |
|---|---|---|---|
| 3,508,653 | 8/1975 | Coleman | 210/DIG. 23 |
| 3,741,400 | 6/1973 | Dick | 210/DIG. 23 |
| 3,800,947 | 4/1974 | Smith | 210/DIG. 23 |
| 3,814,248 | 6/1974 | Lawhead | 210/DIG. 23 |

FOREIGN PATENTS OR APPLICATIONS

| | | | |
|---|---|---|---|
| 1,574,830 | 7/1969 | France | 128/218 M |

*Primary Examiner*—Frank A. Spear, Jr.
*Assistant Examiner*—Robert G. Mukai
*Attorney, Agent, or Firm*—Kane, Dalsimer, Kane, Sullivan and Kurucz

[57] ABSTRACT

An evacuated tube having both ends closed has a flap type valve fixedly disposed between the ends for dividing the tube into upper and lower chambers. The valve is formed and arranged to provide a passageway between the upper and lower chambers when subjected to centrifugal forces of proper intensity and direction. Upon cessation of the force, the valve closes to provide a separation between the upper and lower chambers.

2 Claims, 2 Drawing Figures

SERUM/PLASMA SEPARATORS WITH CENTRIFUGAL VALVES

BACKGROUND OF THE INVENTION

1. Field of the Invention

The present invention relates to separators and more particularly to a device for separating blood plasma from cellular material of the type disclosed in commonly assigned application Ser. No. 247,483 filed Apr. 25, 1972, now U.S. Pat. No. 3,849,072.

2. Description of the Prior Art

With the development of modern pathology laboratories, it has become the common practice to send blood samples to a centralized laboratory facility for analysis. The normal procedure requires that the patient's blood sample be taken at a doctor's office or a clinic and thereafter mailed in a proper container to a centrally located laboratory to be tested. In many instances, it is desirable that the cellular material contained in a blood sample be separated from the blood plasma shortly after the sample is taken from the patient and prior to mailing. Centrifuging has become the accepted method for separation of the suspended cellular material from the blood plasma.

It is known to separate blood into its component parts by centrifugation, for example, the assembly disclosed in U.S. Pat. No. 2,460,641. However, this particular assembly does not employ a means for sealing the separated plasma or serum phase from the cellular phase.

It is also known to provide assemblies for manually separating the plasma or serum phase from the cellular phase, for example, as disclosed in U.S. Pat. Nos. 3,586,064; 3,661,265; 3,355,098; 3,481,477; 3,512,940 and 3,693,804. In all of these devices the serum is collected in a blood collection container and means are provided for separating the plasma or serum phase from the cellular phase employing filters, valves, transfer tubes or the like.

It is also known to provide assemblies for the sealed separation of blood in which a piston is actuated by centrifugal force such as is disclosed in U.S. Pat. Nos. 3,508,653 and 3,779,383. These devices use either a distortable piston made of a resilient material or valve means associated with the piston to affect a sealed separation after centrifugation.

SUMMARY OF THE INVENTION

The present invention contemplates an evacuated tube having closed ends and a valve fixedly disposed between the ends to divide the tube into upper and lower chambers. The valve includes an elastomeric body having a centrally located circular opening with a flap valve closing the opening. The flap has a specific gravity greater than blood and when subjected to centrifugal forces will unseat to open the valve so that the chambers communicate.

In the disclosed embodiment, a tube is used having an opening at each end, said openings being closed with penetrable stoppers. The tube is evacuated through the stopper in the lower end so that the lower chamber is evacuated first. A pressure differential is developed across the valve which causes the flap valve to unseat. When the flap is unseated, the upper and lower chambers come into communication so that the upper chamber is also evacuated.

The tube is filled by puncturing the stopper disposed in an upper end of the tube and the vacuum in the upper chamber draws blood into the tube. As the upper chamber is filled with blood, a pressure differential is developed across the flap valve, the flap is unseated and the blood flows into the evacuated lower chamber. Thus, the entire container is filled with a blood sample.

Upon subsequent centrifuging the heavy flap is forced to unseat and a passage is formed connecting the upper and lower chambers so that the blood cells, being heavier, flow in a downward direction causing the lighter plasma to be displaced into the upper chamber of the tube in a manner well known in the art.

When centrifuging is discontinued, the flap valve again assumes a seated position so that a seal is provided between the cellular material and the plasma. The seal is closed, so the tube may be mailed to a laboratory without fear of the plasma being remixed with the cellular material.

The primary objective of the present invention is to provide an improved device that may be used to collect a blood sample from a patient, separate the blood sample into its light and heavy phases, and maintain the phases separate while the sample is mailed to a laboratory, all at a relatively reduced cost.

Another objective of the present invention is to provide an improved blood plasma separator that simplifies the procedure required for the separation and shipment of a blood sample.

The foregoing objectives and advantages of the invention will appear more fully hereinafter from a consideration of the detailed description which follows, taken together with the accompanying drawings. It is to be expressly understood, however, that the drawings are for illustrative purposes only and are not to be considered as defining the limits of the invention.

DETAILED DESCRIPTION OF THE PREFERRED EMBODIMENT

Figure 1:
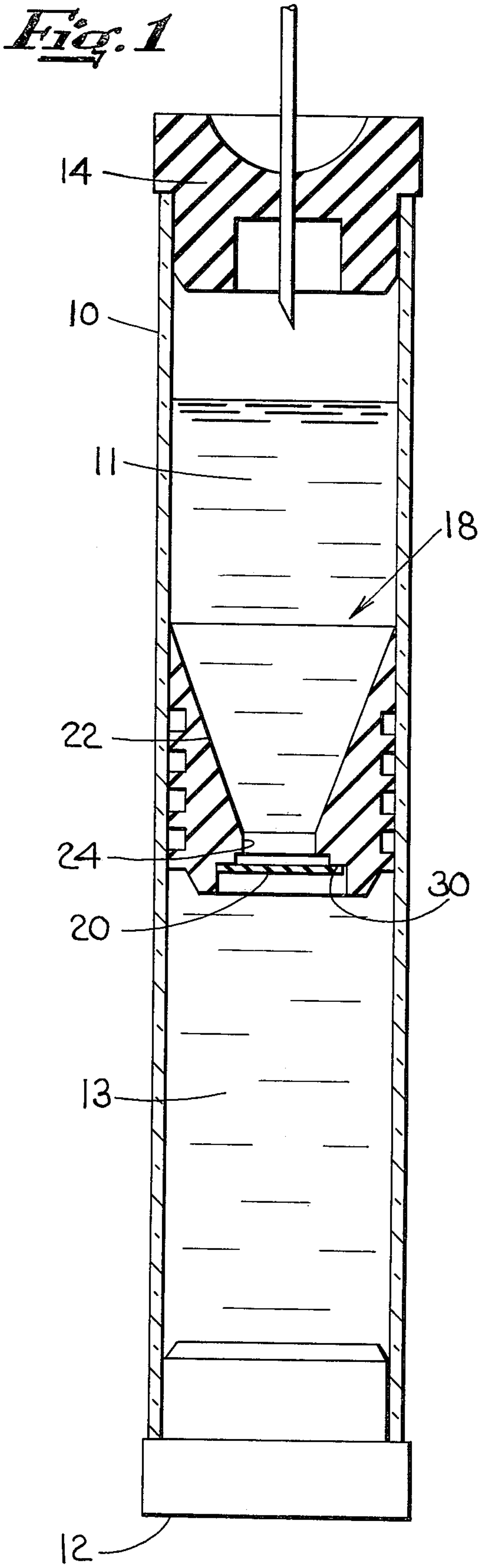
FIG. 1 is a longitudinal section of a plasma separator of the present invention containing a blood sample with the flap valve in a closed position.
Figure 2:
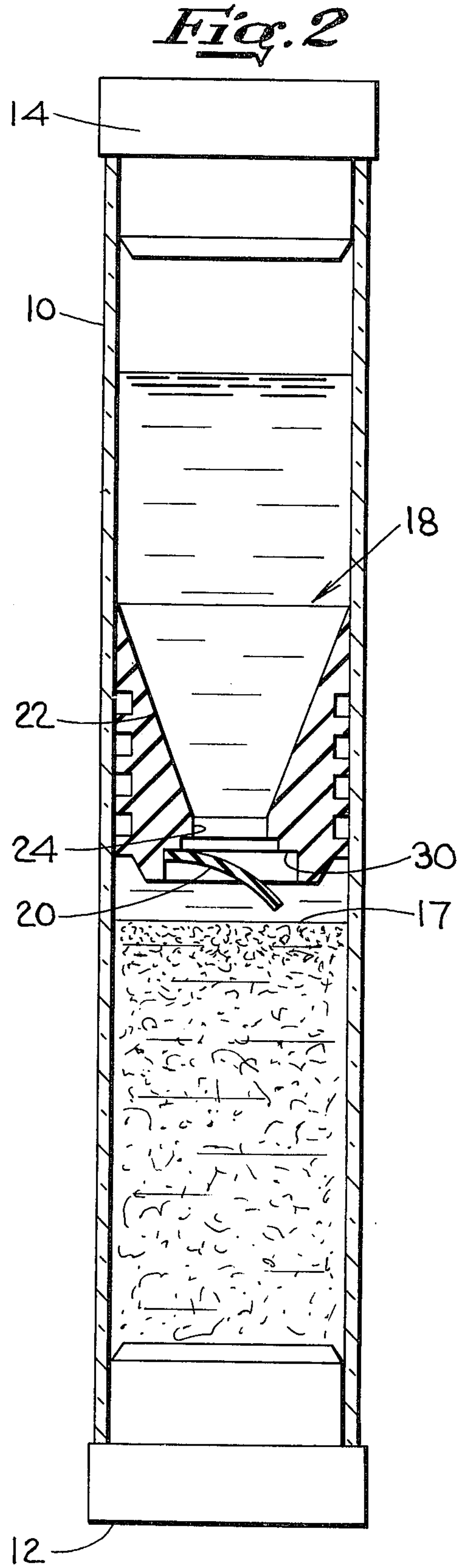
FIG. 2 is a similar view with the valve open and the sample separated into its light and heavy phase as during centrifugation.

Referring to FIG. 1, there is shown a glass tube 10, having openings at each end which are closed by stoppers 12 and 14. Stoppers 12 and 14 are preferably resilient and penetrable by a cannula for purposes of evacuating and filling the tube. A centrifugal valve 18 is disposed within tube 10 and properly positioned to divide the tube into an upper chamber 11 and a lower chamber 13.

It is to be understood that the valve could be positioned and secured in many ways well known in the art. In the disclosed embodiment of the present application, the fit between the valve and the inside diameter of the tube may be of sufficient tightness so that once the valve is forced into a particular position during assembly the frictional forces between the valve and the tube will retain the valve at the desired position during its life including periods of centrifuging.

The valve is positioned so that it is above an interface 17 that is formed between the plasma and the cellular material of the blood during centrifuging. This is essential so that the plasma remains free of cellular material during mailing or other handling of the sample.

Valve 18 is made of an elastomeric material such as an inert rubber or plastic material. A flap with one edge secured and the other edges free is formed of one of a variety of materials having a specific gravity greater than that of blood. The material from which the flap is manufactured must be chemically inert relative to blood and possess resiliency. A suitable elastomeric material may be employed for such purpose.

Valve 18 has a conical-shaped upper surface 22 forming a funnel that is in communication with a circular opening 24 formed in the center of the valve and extending therethrough. The upper periphery of surface 22 terminates in a feather edge which seals against the inner surface of tube 10 to facilitate unrestricted flow of cellular material through the valve during centrifuging and to prevent blood cells from being caught between the valve and the inner surface of the tube.

After the valve is inserted in tube 10, stoppers 12 and 14 are placed in their respective ends and the tube is evacuated through stopper 12 in a manner well known in the art. Evacuation of the lower chamber causes a pressure differential across flap 20 thereby causing the flap to flex downwardly opening the passageway to the upper chamber so that it too is evacuated.

When the tube is to be filled with a blood sample, stopper 14 is punctured with a cannula so that blood is drawn into the evacuated upper chamber. As the upper chamber fills with blood, a pressure differential is created across flap 20 causing it to be flexed downwardly and be unseated from surface 30. The unseating of flap 20 allows blood to flow into the lower chamber so that the entire tube is filled with the blood sample.

In order to separate the plasma from cellular material, the entire device is centrifuged so that centrifugal force is exerted in the direction of stopper 12. Since flap 20 has a specific gravity greater than blood, the flap is urged to flex in a downwardly direction so that a passage is formed between the upper and lower chambers. The heavier red blood cells flow in a downwardly direction displacing the plasma in the lower chamber so that it flows in an upwardly direction into the upper chamber until a plasma-cell interface 17 is established below valve 18. When interface 17 is established, centrifuging is stopped and flap 20 is again seated against surface 30 thereby creating a permanent separation between the upper and lower chambers. The seal created by the flap 20 and surface 30 is tight so that the tube may thereafter be shipped by mail to a laboratory without the cellular material being remixed with the plasma.

Minor modifications may be made to the above-described device that fall within the inventive concepts of the invention.

I claim:

1. A separator device for separating mixed light phase and heavy phase constituents of blood and establishing a permanent barrier between said phases, including:

a tubular container closed at both ends and adapted to contain the blood to be separated;

elastomeric barrier means fixedly located intermediate the container ends attached to the inner side wall of the container and dividing the container into first and second chambers such that upon separation of the blood into the light phase and the heavy phase by the application of centrifugal force, the first chamber contains only the light phase;

a passageway through the barrier means connecting the first and second chambers, said barrier means further including a conical surface, adjacent the first chamber, which forms a funnel that is in communication with the passageway to facillitate the separation of the phases and the flow of the heavy phase into the second chamber;

a valve seat defined by a wall of the barrier means disposed about the passageway; and a flexible flap valve means extending over the valve seat having one portion of the edge fixed to the barrier means and the other portions of the edge free, the flap means having a specific gravity greater than blood and normally sealing off the passageway to provide a barrier between first and second chambers, and when subjected to a predetermined centrifugal force, the flap means flexes away from the valve seat to open the passageway to provide communication between the chambers to permit the major portion of the light phase to travel to the first chamber and the heavy solid phase to travel to the second chamber, and upon cessation of the applied centrifugal force, the flap means returns to its normal position on the valve seat to seal off the passageway and provide a barrier between the first and second chambers.

2. A separator device according to claim 1, wherein one of the container closed ends includes a stopper penetrable by a cannula to facilitate the introduction of blood into the container.

* * * * *